United States Patent [19]

Heller et al.

[11] Patent Number: 4,876,894
[45] Date of Patent: Oct. 31, 1989

[54] PRESSURE GUAGE CONNECTION

[75] Inventors: Heinz Heller, Rippberg; Roland Waigand, Klingenberg/Main, both of Fed. Rep. of Germany

[73] Assignee: Alexander Wiegand GmbH & Co., Klingenberg/Main, Fed. Rep. of Germany

[21] Appl. No.: 207,771

[22] Filed: Jun. 16, 1988

[30] Foreign Application Priority Data

Jun. 25, 1987 [DE] Fed. Rep. of Germany ... 8708828[U]

[51] Int. Cl.[4] ............................................. G01L 7/04
[52] U.S. Cl. ........................................ 73/756; 73/741
[58] Field of Search ................. 73/706, 756, 714–746; 137/228

[56] References Cited

U.S. PATENT DOCUMENTS

| | | | |
|---|---|---|---|
| 1,691,135 | 11/1928 | Schlaich | 73/742 |
| 2,181,730 | 11/1939 | Heise | 73/732 |
| 2,261,027 | 10/1941 | Hopkins | 73/706 |

*Primary Examiner*—Donald O. Woodiel
*Attorney, Agent, or Firm*—Roth & Goldman

[57] ABSTRACT

A pressure guage connection for connecting a pressure sensing device such as a manometer or an electrical pressure detector to a pressurized vessel or conduit is disclosed. The connection element constitutes a cylindrical stem designed in one piece with the device carrier, with said cylindrical stem having a ring-type flange at its end. The ring-type flange places an attachment element to the cylindrical stem in an undetachable manner. The attachment element also has a deformation portion which is deformable in the radial direction after the placement onto the cylindrical stem, with a shoulder being formed as a result of the deformation and with the attachment element resting against the ring-type flange via this shoulder. The attachment element can be a clamping nut or a cap screw. A reinforcement seal is designed to be located at the end of the ring-type flange facing the pressurized vessel, with said reinforcement seal having a semi-circular, a semi-elliptical or a concavely bent cross section with a plane parallel, pressure-bearing surface area.

9 Claims, 1 Drawing Sheet

PRESSURE GUAGE CONNECTION

BACKGROUND OF THE INVENTION AND PRIOR ART

The invention relates to a pressure gauge connection for manometers and for electrical pressure detectors in the area of high-pressure, ultravacuum as well as high and low temperature technology. This type of application requires a purely metallic, often detachable connection, which must react in a chemically neutral manner with respect to the medium which is flowing through. These types of requirements are often placed upon the semiconductor industry, medical technology and the food- and tobacco industry.

Previously, pressure connectors with an external thread-connection stem, a plane sealing surface and flat gasket rings or a quick connector with a sealing head and an O-ring, such as those described in the German Utility-Model Patent 81 22 006, have been used as connectors. In addition, a method is known by which a pipe connection stem with a sealing flange and a clamping nut is welded to the carrier of the metering element of a manometer or to the pressure detector base of an electrical pressure detector.

An external thread-connection socket does not allow for an adjustment or alignment of the measuring device without causing a decrease in the sealing action.

The quick connector has only limited applications on account of the O-ring, which is manufactured from a different material, and the welding of the pipe connection stem with a sealing flange is complex and constitutes a possible site of leakage and contamination.

SUMMARY OF THE INVENTION

The invention is based on the objective to create a pressure gauge connection of the type described above, which is safe to operate and inexpensive.

DESCRIPTION OF THE PREFERRED EMBODIMENT

Figure 1:
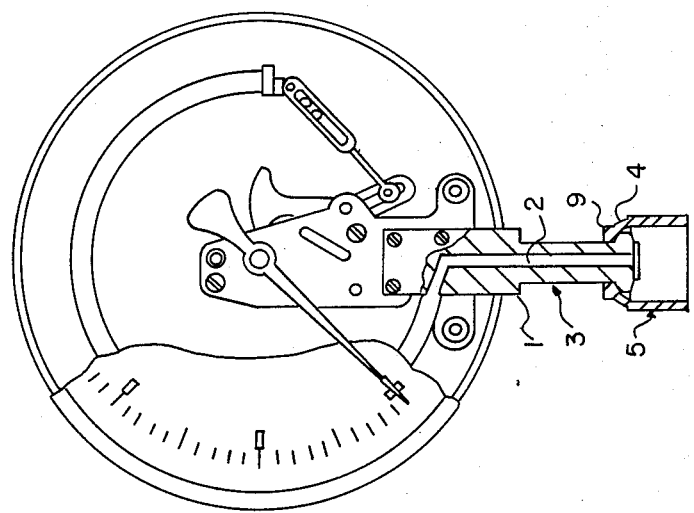
FIG. 1 is a frontal view of a pressure gauge with the connection in accordance with the invention.

In accordance with the invention, the bottom end of the metering element carrier of a manometer, respectively of the pressure detector base of an electrical pressure detector is designed in one piece with a cylindrical stem, which, at its end, exhibits a ring-type flange and an attachment element located at the back-side of the ring-type flange, with said attachment element being a clamping nut or a cap screw.

Preferably, the clamping nut, respectively the cap screw has a step-shaped, cylindrical deformation portion, which comprises about one quarters of their total length, with said deformation portion exhibiting a through-hole with a diameter, which is greater than 1.05 times the diameter of the ring-type flange. Following the slipping on of the clamping nut, respectively of the cap screw onto the ring-type flange with the help of a pressure tool, the deformation portion is deformed in such a manner that the through-hole now is only 1.05 times the diameter of the external diameter of the cylindrical stem. On top of this, the clamping nut, respectively the cap screw rests against the back-side of the ring-type flange with the newly formed shoulder portion.

In another advantageous embodiment of the invention, an axial reinforcement seal is formed on the connection side of the ring-type flange, with said reinforcement seal exhibiting a semi-circular, semi-elliptical or concavely bent cross section with a plane parallel, pressure-bearing surface area.

The pressure gauge connection according to the invention constitutes a construction unit consisting of the metering element carrier of the manometer, respectively the pressure detector base of the electrical pressure detector, the connection element in the form of the cylindrical stem and the attachment element, for example the clamping nut respectively the cap screw. These structural elements were previously used a individual construction pieces as a result of which the assembly was time consuming and expensive. The construction unit has been made possible as a result of the single-piece design of the metering element carrier, respectively the pressure detector base with the cylindrical stem and by means of the special design of the clamping nut, respectively of the cap screw. Consequently, an extremely temperature-resistant, tight, chemically pure connection for a pressure gauge, which can be manufactured in a simple manner, has been created in accordance with the invention.

One example of an embodiment of the invention is illustrated in the drawing and will be explained in more detail in the following:

According to FIG. 1, a cylindrical stem 3 is designed in one piece at the bottom end of a metering element carrier 1, which exhibits a through-hole 2, with said cylindrical stem exhibiting a ring-type flange 4 located at the bottom end. A clamping nut 5 is held at the ring-type flange 4 with the help of the shoulder section 9.

Figure 2A:
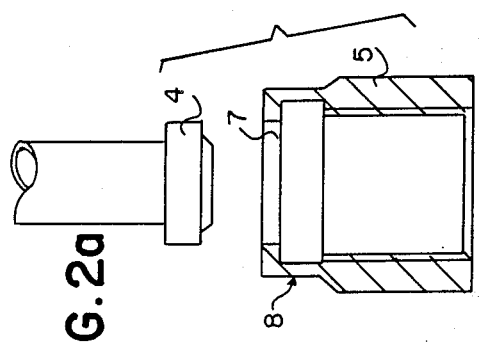
FIG. 2 is the connection in accordance with the invention prior to the mounting of the clamping nut (FIG. 2a) and after the mounting of the clamping nut (FIG. 2b)
Figure 2B:
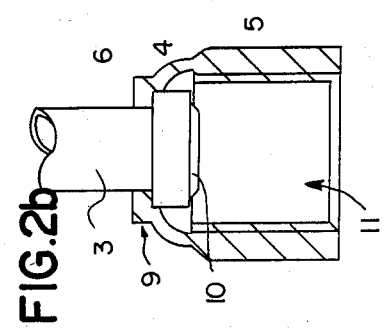

FIGS. 2a and 2b show the clamping nut 5 before, respectively after the mounting on the cylindrical stem 3.

A diameter of a through-hole 7, which is formed in a step-shaped deformation portion 8 of the clamping nut 5, according to FIG. 2a, is larger than the axial diameter of the ring-type flange, such that the clamping nut 5 can be slipped over the ring-type flange 4 in a simple manner. The diameter of the through-hole 7 is reduced to about 1.05 times the dimension of the outer diameter of the cylindrical stem 3 by means of applying pressure to the deformation portion 8 in a radial direction, for example with the help of the corresponding tool, such that the clamping 3 is held to the ring-type flange 4 of the cylindrical stem nut 5 by means of its newly formed shoulder 6 and consequently can no longer be detached from this socket.

Figure 3A:
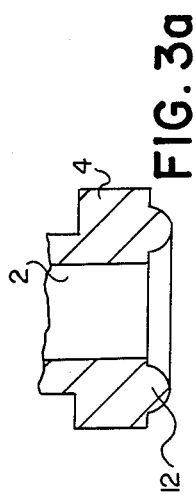
FIGS. 3a, 3b, 3c show the different embodiments of the axial reinforcement seal at the connector-side of the ring-type flange.
Figure 3B:
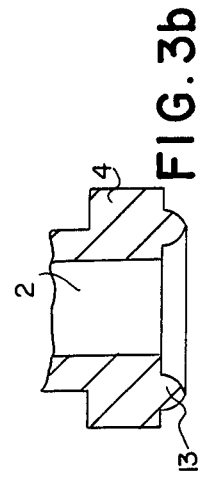
Figure 3C:
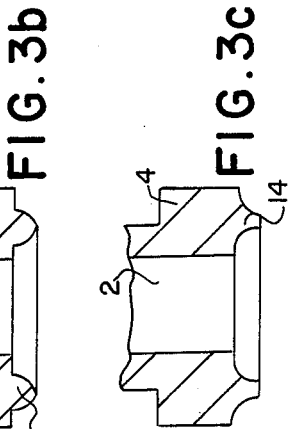

An axial reinforcement seal 10, which is formed at the outer side 11 of the ring-type flange 4 can exhibit a semi-circular cross section according to FIG. 3a, a semi-elliptical cross section according to FIG. 3b and a concavely bent cross section with a plane parallel pressure-bearing surface area according to FIG. 3c.

Figure 4:
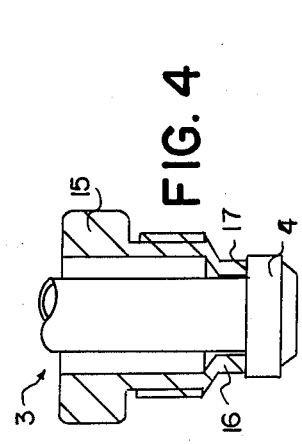
FIG. 4 is the connection according to the invention after the mounting of a cap screw.

Instead of the clamping nut 5 it is also possible for a cap screw 15 to be mounted on the cylindrical stem 3. Such a cap screw is illustrated in the mounted state in FIG. 4.

The cap screw 15 exhibits a deformation portion 16, which, after the placement of the cap screw 15 onto the cylindrical stem 3, is deformed in the radial direction with the help of a suitable tool in such a manner that a shoulder 17 is formed. The cap screw 15 is held on the cylindrical stem 3 via the shoulder 17 and the ring-type flange and can no longer be detached from said cylindrical stem.

Persons skilled in the art will readily appreciate that various modifications can be made from the preferred embodiment thus the scope of protection is intended to be defined only by the limitations of the appended claims.

We claim:

1. A connection for connecting a pressure sensor to a pressure vessel or conduit, said connection comprising:
   (a) a stem integrally connected at one end to a pressure sensor and having a flange at its other end; and,
   (b) an attachment element receiving said flange of said stem therein, said attachment element having a deformation portion which is deformable radially inwardly toward said stem after said attachment element is placed onto said stem, said attachment element having a shoulder thereon which has radially and axially extending surfaces which sealingly engage radially and axially extending surfaces on said stem when said deformation portion is deformed toward said stem whereby said interengaged surfaces form said seal.

2. A pressure sensor connection according to claim 1 wherein said deformation portion encompasses about one quarter of the total length of said attachment element.

3. A pressure sensor connection according to any one of the claims 1 or 2, wherein said attachment element exhibits a through-hole, having a diameter when deformed of about 1.05-times the outer diameter of said stem.

4. A pressure sensor connection according to any one of the claims 1 or 2, wherein said attachment element comprises a clamping nut.

5. A pressure sensor connection according to any one of the claims 1 or 2, wherein said attachment element comprises a cap screw.

6. A pressure sensor connection according to any one of the claims 1 or 2, wherein said flange has a reinforcement seal at the end of said flange that faces the pressure vessel or conduit.

7. A pressure sensor connection according to claim 6, wherein said reinforcement seal has a semicircular cross section.

8. A pressure sensor connection according to claim 6, wherein said reinforcement seal has a semielliptical cross section.

9. A pressure sensor connection according to claim 6, wherein said reinforcement seal comprises a concave cross section with a flat pressure-bearing surface area.

* * * * *